(No Model.)
C. A. BAILEY.
MOLD FOR ORNAMENTING CAKE.
No. 360,753. Patented Apr. 5, 1887.
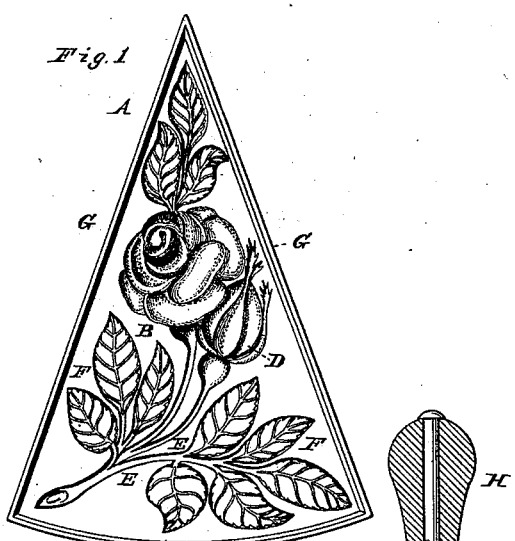
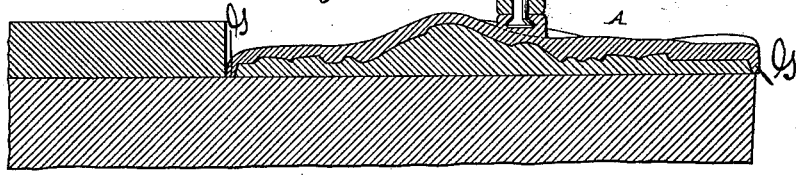
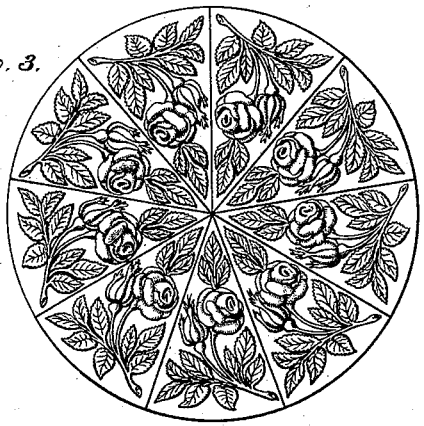
WITNESSES
Villette Anderson.
Philip C. Masi.
INVENTOR
Chas. A. Bailey
by Anderson + Smith
his ATTORNEYS

UNITED STATES PATENT OFFICE.

CHARLES A. BAILEY, OF MIDDLETOWN, CONNECTICUT.

MOLD FOR ORNAMENTING CAKE.

SPECIFICATION forming part of Letters Patent No. 360,753, dated April 5, 1887.

Application filed October 8, 1886. Serial No. 215,690. (No model.)

*To all whom it may concern:*

Be it known that I, CHARLES A. BAILEY, a citizen of the United States, and a resident of Middletown, in the county of Middlesex and State of Connecticut, have invented certain new and useful Improvements in Molds for Ornamenting Cakes; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is a representation of this invention, and is a view of the under side of the stamp. Fig. 2 is a vertical section through the stamp and a portion of cake to which it is applied. Fig. 3 is a top view of a cake after being ornamented with the aid of the stamp.

My invention has relation to molds designed for use in ornamenting and marking the frosted surfaces of cakes, and also to the process of ornamenting and marking the same by the use of the molds, as hereinafter described and claimed.

Before describing the details of construction I desire to say that I am well aware that it is old to provide the face of a rolling-pin with figures and designs of various characters which have a border-line formed by a flange or the like.

Referring by letter to the accompanying drawings, A designates a stamp or mold, which is provided on its lower face with any suitable design, B, the members of which are both raised and sunken, representing a rose or roses, C, and a bud or buds, D, attached to their stems E, and surrounded by leaves F in some desirable natural design, such as is shown in the illustration. The mold or stamp A is made sector shape in outline, and is provided along its edges with vertically-depending flanges G, which are designed to mark the lines in the frosting along which the knife-cut is to be made in cutting the cake to serve it.

The cake is covered with frosting or other material that can be stamped.

The frosting is made in the ordinary way, with the exception that it is made thicker than usual. Then, after it has been spread upon the surface of the cake, it is permitted to stand a short time until it thickens a little more. After the frosting has thickened sufficiently, I dust upon it a little fine sugar, to prevent the stamp from sticking, and I also dust the face of the stamp with starch for the same purpose, after which there will be no danger of the stamp sticking to the frosting, and no trouble in getting a good figure when making the impression. The line-marks also permit the knife to cut through them without breaking the frosting, so that the cut pieces of cake will contain the ornamentation in its perfect form. The stamp is provided with a handle, H, by which to manipulate it in performing the operation.

Having described this invention, what I claim, and desire to secure by Letters Patent, is—

A mold for ornamenting the frosted surfaces of cakes, said mold being of sector shape in outline, and having upon its face an ornamental design and a marginal vertical marking-flange, whereby a cake may be divided into parts from a central point without breaking the ornaments, substantially as specified.

In testimony whereof I affix my signature in presence of two witnesses.

CHAS. A. BAILEY.

Witnesses:
WM. T. ELMER,
FREDERIC VINAL.